(12) United States Patent
Sielhorst et al.

(10) Patent No.: US 8,596,704 B2
(45) Date of Patent: Dec. 3, 2013

(54) CLOSURE FOR A STORAGE COMPARTMENT OF A MOTOR VEHICLE

(75) Inventors: Bernhard Sielhorst, Sontra (DE); Vincent Chevroton, La Wantzenau (FR); Christophe Pignon, Montebéliard (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 419 days.

(21) Appl. No.: 12/742,767

(22) PCT Filed: Oct. 7, 2008
(Under 37 CFR 1.47)

(86) PCT No.: PCT/EP2008/063405
§ 371 (c)(1),
(2), (4) Date: Feb. 24, 2011

(87) PCT Pub. No.: WO2009/062791
PCT Pub. Date: May 22, 2009

(65) Prior Publication Data
US 2011/0169291 A1    Jul. 14, 2011

(30) Foreign Application Priority Data

Nov. 14, 2007  (DE) .................. 10 2007 000 899

(51) Int. Cl.
*B60R 7/06*     (2006.01)
(52) U.S. Cl.
USPC .................................... 296/37.8; 296/37.12
(58) Field of Classification Search
USPC ............ 296/37.1, 37.8, 37.12, 24.34; 70/282; 292/219, 220, 251.5, 163, 164
See application file for complete search history.

(56) References Cited

U.S. PATENT DOCUMENTS

| 5,241,218 A | 8/1993 | Page |
| 5,613,716 A | 3/1997 | Cafferty |

(Continued)

FOREIGN PATENT DOCUMENTS

| DE | 3508338 A1 | 11/1985 |
| DE | 19617403 A1 | 11/1997 |

(Continued)

OTHER PUBLICATIONS

International Search Report for corresponding PCT Application PCT/EP2008/063405, dated Dec. 22, 2008, (PCT/ISA/210).

*Primary Examiner* — Glenn Dayoan
*Assistant Examiner* — Gregory Blankenship
(74) *Attorney, Agent, or Firm* — Timothy X. Gibson, Esq.; Gibson & Dernier LLP

(57) ABSTRACT

A closure for a storage compartment of a motor vehicle including an electromagnet having an armature wherein the armature can by moved by excitation of the electromagnet, and wherein a movement of the armature can be transmitted to a locking element which, due to a restoring force of a spring, is in a locked position for the storage compartment when the electromagnet is not energized, a means for generating an electric current for exciting the electromagnet, and means for measuring the electric current flow used for exciting the electromagnet, wherein the means for generating the current are designed to control the electric current such that, after turning on the current after measuring when a maximum current is reached and subsequent dropping below said maximum current, the current is reduced to a predetermined minimum value, wherein the minimum value is such that the armature is held in its position against the spring force acting on the armature.

20 Claims, 6 Drawing Sheets

(56) References Cited

U.S. PATENT DOCUMENTS

| | | | |
|---|---|---|---|
| 6,971,667 B2 * | 12/2005 | Enders et al. | 280/730.1 |
| 7,004,517 B2 * | 2/2006 | Vitry et al. | 292/213 |
| 7,878,035 B2 * | 2/2011 | Yamaguchi et al. | 70/161 |
| 2004/0135353 A1 | 7/2004 | Enders et al. | |
| 2004/0255626 A1 | 12/2004 | Petasch et al. | |
| 2008/0007081 A1 * | 1/2008 | Shibata et al. | 296/37.12 |
| 2010/0071424 A1 * | 3/2010 | Tsuruta | 70/91 |
| 2011/0169291 A1 * | 7/2011 | Siethorst et al. | 296/37.8 |

FOREIGN PATENT DOCUMENTS

| | | | |
|---|---|---|---|
| DE | 19736561 A1 | 3/1999 | |
| DE | 10326416 A1 | 12/2004 | |
| EP | 0499419 A2 | 8/1992 | |
| JP | 2011-241641 * | 12/2011 | B60R 7/06 |
| KR | 102001037915 | 5/2001 | |
| KR | 1020010037915 A | 5/2001 | |

* cited by examiner

CLOSURE FOR A STORAGE COMPARTMENT OF A MOTOR VEHICLE

CROSS REFERENCE TO RELATED APPLICATIONS

This application claims priority to International Patent Application No.: PCT/EP2008/063405, filed Oct. 7, 2008, the entire disclosure of which is hereby incorporated by reference.

FIELD OF THE INVENTION

The invention relates to a closure for a storage compartment of a motor vehicle, a storage compartment and a method to unlock the storage compartment.

BACKGROUND

Storage compartments for a motor vehicle are known from prior art. Typically, these storage compartments comprise a cover, which can be locked and unlocked by means of a closure. A glove compartment is one such example for a storage compartment. The closure of the glove compartment known from prior art typically comprises a pin mounted to the glove compartment, which is pushed into a recess at the glove compartment by means of a restoring spring, so that the glove compartment is locked by the pin when the cover is closed. The pin is further connected to a handle mounted to the outside of the cover by means of, for example, a mechanical connecting rod. Thus, by pulling the handle the pin can be pulled from the recess, which unlocks the glove compartment.

Glove compartments that can be unlocked by means of an electric motor, which powers a worm gear, are also known from prior art. The worm gear shortens or lengthens a cable pull or a Bowden cable, which in turn moves locking elements, such as for example bolts, via a rod system in such a way that the glove compartment is unlocked. The disadvantage is that the electric motor must be accommodated inside the glove compartment enclosure. Since the electric motor is relatively big, it limits the options to design glove compartment boxes. When in operation the electric motor also causes acoustic noises, which are clearly perceptible for passengers inside the vehicle. The frequencies of these acoustic noises range between 1 and 3 kHz, making them not only clearly perceptible, but also extremely annoying and disruptive.

DE 196 17 403 A1 discloses a closure for a glove compartment cover of a vehicle. The closure comprises an electromagnet, into the longitudinal bore of which an armature engages. The latter is attached to a locking element, which—via the effect of a pressure spring—engages into a receiving bore when the glove compartment cover is in locked position. When the electromagnet, or the coil of the electromagnet, is excited, the armature is pulled into the longitudinal bore of the electromagnet, pulling the locking element from the receiving bore, thus unlocking the glove compartment. The problem of this process is that the movement of the armature or of the associated locking element causes clearly audible noises in the form of tick-tacking perceivable by a passenger when the armature moves from the locking element's locked position into the unlocked position, as well as in opposite direction.

U.S. Pat. No. 5,613,716 discloses a glove compartment unlocking device with minimized noise based on optimizing an actuator control. The actuator in this connection serves to actuate a lock for a door-locking system of a motor vehicle.

KR 10 2001 03 7915 discloses a glove compartment comprising a locking and unlocking unit for opening and closing the glove compartment. DE 103 26 416 A1 discloses a locking device and a locking method for a movable element, particularly a flap or a drawer.

DE 196 17 403 A1 discloses a glove compartment cover of a motor vehicle, wherein an electromagnet is inserted into the dashboard, into the longitudinal bore of which a guiding section engages. The latter is attached to a locking pin, which—caused by the effect of a pressure spring—engages into a receiving bore when the glove compartment cover is in locked position. When the electromagnet is excited, the guiding section is pulled into the longitudinal bore of the electromagnet, so that the locking pin is located outside of the cross-segment of the glove compartment cover, making it possible to pivot the locking pin into the open position.

EP 0 499 419 A2 discloses that the current consumption characteristics of the electromagnet can be used to ascertain as to whether or not a movement of the electromagnet's armature took place.

DE 35 08 338 A1 discloses a device for electrically operating a garage door. The objective of the invention—as disclosed in document 3—is to create a device for electrically operating a garage door, wherein this device is to work in the most economical manner possible. For this purpose a higher feeding current is initially supplied to the electromagnetic locks for the unlocking process to retract the locking pins, and then a lower holding current.

SUMMARY OF THE INVENTION

It is the task of the invention to create an improved closure for a storage compartment of a motor vehicle, an improved storage compartment and an improved method to unlock the storage compartment.

According to the invention a closure for a storage compartment of a motor vehicle is created, wherein the closure comprises at least one electromagnet. The electromagnet comprises an armature, wherein the armature can be moved by exciting the electromagnet. One movement of the armature can be transmitted to at least lone locking element, wherein the at least one locking element, due to a restoring force of a spring, is in a locked position for the storage compartment when the electromagnet is not energized. The closure further comprises means for generating an electric current for exciting the electromagnet. Moreover, the closure comprises means for measuring the electric current flow used for exciting the electromagnet, wherein the means used for generating the current are designed to control the electric current such that, after turning on the current after measuring when a maximum current is reached and subsequent dropping below said maximum current, the current is reduced to a predetermined minimum value.

The electromagnet typically involves a stroke magnet, in which the armature can be moved alongside the longitudinal bore of the electromagnet. In this connection the armature consists of a magnetic material or at least comprises a magnetic core, such as for example a soft-iron core. Energizing the magnet with electric current generates a magnetic field, causing a force to be exerted on the armature, so that said armature can be moved alongside the longitudinal bore of the electromagnet. The armature is coupled to one or several locking elements, so that a movement of the armature can be transmitted to the locking element or to the locking elements. The armature and/or the locking elements are further supplied with one or several springs, so that the locking elements, due to the restoring forces of the springs, are positioned in the locked position for the storage compartment when the electromagnet is not energized. When the electromagnet is excited with the electric current, a sufficiently strong magnetic field is generated, so that the armature can be moved in the magnet's longitudinal bore against the restoring forces of the spring, thus making it possible to bring the locking elements coupled to the armature into the unlocked position.

In doing so, the smallest possible amount of energy is initially applied to the system to be moved, comprised of the electromagnet, the armature and/or the locking element. It is for example possible to continuously increase an electric voltage used to excite the electromagnet. This also automatically results in a continuous increase of the electric current flow that flows through the electromagnet. At the moment at which the armature starts to move, the current required to excite the electromagnet spontaneously decreases with constant voltage. This means that, when the armature starts to move, maximum current flow is reached, with the current subsequently dropping below said maximum current due to the armature's movement. After it is detected that the current has fallen below the maximum current supplied thus far, the current used to excite the electromagnet is reduced to a minimum value.

This minimum value is precisely dimensioned such that it is possible to the hold the armature in its current position against the spring forces acting on the armature. Thus, the armature, or the locking element, does not impact the enclosure of the electromagnet, either due to excessively high currents and its momentum, or because the armature is catapulted back into its initial position as a result of the restoring forces of the springs. For this reason no—or at least almost no—noises are generated when the closure of the storage compartment is opened, when the armature or the locking elements reach their unlocked position.

According to one embodiment of the invention, the electric current to excite the electromagnet is controllable such that the electric current can be continuously increased over a first time period until the measured maximum current is reached. Thus, the current to excite the electromagnet is not abruptly turned on and increased. Rather, the current is slowly increased over a first time period until the electric current is sufficient to put in motion the locking elements coupled to the armature, thus achieving unlocking.

According to another embodiment of the invention, the current can be reduced to the predetermined minimum value for a second time period, wherein the locking element is in an unlocked position for the storage compartment over the second time period. The advantage is that, over the entire second time period, for example, the cover of a storage compartment has enough time to smoothly transition from the locked position to the unlocked position.

According to another embodiment of the invention, the electric current, after the end of the second time period, can be controlled such that it is continuously reduced over a third time period. Due to this continuous reduction over the third time period the armature is not catapulted back into the initial position because of the springs' restoring forces, but returned to its initial position in a relatively slowly proceeding movement. This is the reason why no—or at least almost no—noises are generated when the armature or the locking elements reach the locked position, since they do not impact anything in a clearly audible manner due to the slow movement.

This prevents the passenger of a motor vehicle from hearing clearly audible outside noises when activating the closure, especially after the glove compartment is already open. The objective in this connection is—in particular against the background noise of a motor vehicle in operation—that the volume of the impact noise falls below the perception threshold of a vehicle passenger.

It must be pointed out that the mechanical durability of such a closure, like the closure according to the invention, is significantly increased compared to closures known from prior art. By reducing the used currents to minimally needed currents for moving and mounting the armature in a predetermined position, most of the mechanical parts are subjected to less stress. Moreover, mechanical parts do not impact the electromagnet itself or against a glove compartment box, since the special control of the used currents ensures that the armature or the locking elements slide back and forth smoothly. Furthermore, the closure according to the invention has the additional advantage that a movement of the actuator or of the armature can be detected solely by the flow of the current required for this purpose. This eliminates the cost for installing additional sensor components to detect a successful movement of the actuator.

According to one embodiment of the invention, the electric current can be increased exponentially or linearly during the first time period, and/or reduced during the third time period. For example, the voltage and, related thereto, the electric current is linearly or exponentially increased or reduced. When increasing the electric current, the electric current and/or the electric voltage are increased from zero to a set value, which is required for the movement of the armature. Accordingly, if the electric current is reduced, the electric current and/or the voltage are reduced from the set value to zero during the third time period. However, it must be pointed out in this connection that preferably only one current controller is used, since the closure according to the invention comprises corresponding means to control the electric current and also corresponding means to measure the used electric flow of current.

According to one embodiment of the invention, the closure according to the invention further comprises means to ascertain the predetermined minimum value of the current, wherein the minimum value of the current depends on the ratio between the measured maximum current and the measured value at which the maximum current is not reached. In this connection, the predetermined minimum value is preferably ascertainable via a table, wherein in the table the minimum value of the current is assigned to the ratio between the measured maximum current and the measured value at which the maximum current is not reached. Thus, the minimization of the current in percent is determined based on the maximum and the minimally needed current is determined by comparing said minimization in percent with a comparison value in the table.

Alternatively, it is also possible, after detecting the maximum current and dropping below it, to carry out the lowering to the predetermined minimum value, when the ratio between the currently measured current value and the measured maximum current drops below a predetermined value. For example, lowering to the predetermined minimum value could take place, when the currently measured current value corresponds to only 95% of the maximum measured current value.

According to one embodiment of the invention, the first time period ranges between 5 and 100 ms, the second time period between 0 and 300 ms, and the third time period between 50 and 500 ms.

According to one embodiment of the invention, the closure comprises a sensor for each of the at least one electromagnets, wherein the sensor makes it possible to detect if the armature of the electromagnet is in a position that corresponds to the locked position of the corresponding locking element. The sensor can for example be a Hall sensor, which is mounted to the electromagnet in such a way that the magnetic field of the armature can be detected by means of the Hall sensor when the magnet is turned off, when the anchor is in the position that corresponds to the locked position of the locking elements connected to the armature.

However, as already stated hereinabove, it is preferable to do without such sensors, since conclusions can be drawn from the flow of the currents used for moving the armature to the movement of the armature and thus to the armature position.

According to one embodiment of the invention, the closure comprises a sensor for each locking element, with the sensor making it possible to detect if the corresponding locking element is in the locked position when the storage compartment is closed.

According to one embodiment of the invention, one locking element each is mounted to the armature of one electromagnet each. This makes it possible to reduce the components required to realize the closure to a minimum, since a connecting rod or gear rod elements are no longer necessary.

According to a further embodiment of the invention, the closure comprises one electromagnet, two gear rod elements and a gear wheel, wherein one locking element each is movable at one end of each gear rod element, wherein the gear wheel can be moved by the armature of the electromagnet, wherein one movement of the gear wheel can be transmitted to the gear rod elements, and wherein the locking elements can be moved from the locked position to the unlocked position by the movement.

According to a further embodiment of the invention, the closure comprises damping means. The damping means are provided to dampen the movement of the armature and the locking elements. The damping means are intended to dampen a movement of the armature, or of the locking elements, with a corresponding movement of the locking elements, or the locking element, respectively, from the unlocked position to the locked position. Its is also possible to use the damping means to dampen or prevent the locking element from potentially impacting, for example, the enclosure of the electromagnet when the locking element moves from the locked position to the unlocked position. However, preferably, such impacting is already prevented by reducing the current to a predetermined minimum value when the maximum current is reached and subsequent dropping below said maximum current in such a way that a further movement of the armature, and thus impacting of the locking element on the enclosure of the electromagnet, is effectively prevented.

The damping means may for example involve a PE foam-damping agent. In this connection, the damping agents may be inserted into the entire drive chain from the armature to the locking tip.

According to one embodiment of the invention, the electromagnet is enclosed by sound damping means. This makes it possible to dampen the noises caused by activating the electromagnet, which lie above the entire audible frequency range, so that activating the electromagnet is barely audible for a vehicle passenger. For example, the sound-damping agents may also include PE foam-damping agents. For example, a sound pressure below 55 dB(A) was measured involving a glove compartment prototype with a closure according to the invention at a distance of 740 mm using a dummy head.

According to one embodiment of the invention, the electromagnet involves a double stroke actuator. This way, a first electromagnet is used for the forward movement of the armature and a second electromagnet for the backward movement of the armature in a kinematically coupled manner. In this connection, the spring for the backward movement of the armature is replaced by the second electromagnet, whereby the second electromagnet is energized during the third time period in such an optimized way that impacting of the armature on the electromagnet's enclosure caused by the backward movement of the electromagnet is prevented.

In a further aspect the invention relates to a storage compartment for a motor vehicle comprising an enclosure of the type described hereinabove.

In a further aspect the invention relates to the unlocking of a storage compartment. According to the method an electromagnet is excited with an electric current, wherein the electromagnet comprises an armature, wherein said armature of the electromagnet is coupled to one or several locking elements, wherein each locking element, due to a restoring force of a spring, is in a locked position through engagement in recesses of the storage compartment when the electromagnet is not energized, wherein the locking elements are moved into an unlocked position as a result of exciting the electromagnet with electric current. In this connection, the electric current is controlled such that, after turning on the current after measuring when the maximum current is reached and subsequent dropping below said maximum current, the current is reduced to a predetermined minimum value of the current.

According to one embodiment of the invention, the method comprises the step of controlling the electric current such that the electric current is continuously increased over a first time period until the measured maximum current is reached.

According to one embodiment of the invention, the electric current is further controlled such that the electric current is continuously reduced over a third time period after the end of the second time period.

According to a further embodiment of the invention, the method further comprises the step of determining the predetermined minimum value of the current, wherein the minimum value of the current depends on the ratio between the measured maximum current and the measured value at which the maximum current is not reached. In this connection, the predetermined minimum value is preferably read from a table, wherein in the table the minimum value of the current is assigned to the ratio between the measured maximum current and the measured value at which the maximum current is not reached.

BREIF DESCRIPTION OF THE DRAWINGS

Preferred embodiments of the invention are illustrated in detail below based on the drawings.

Figure 4:
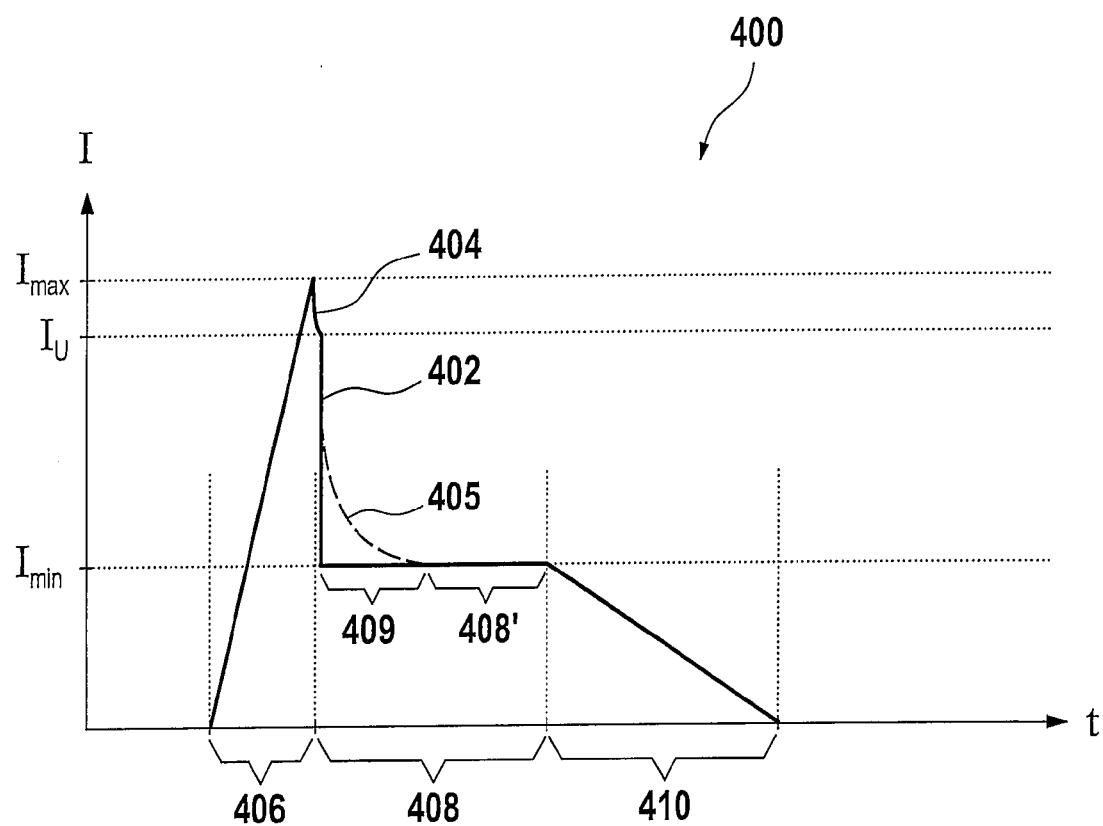
Figure 5:
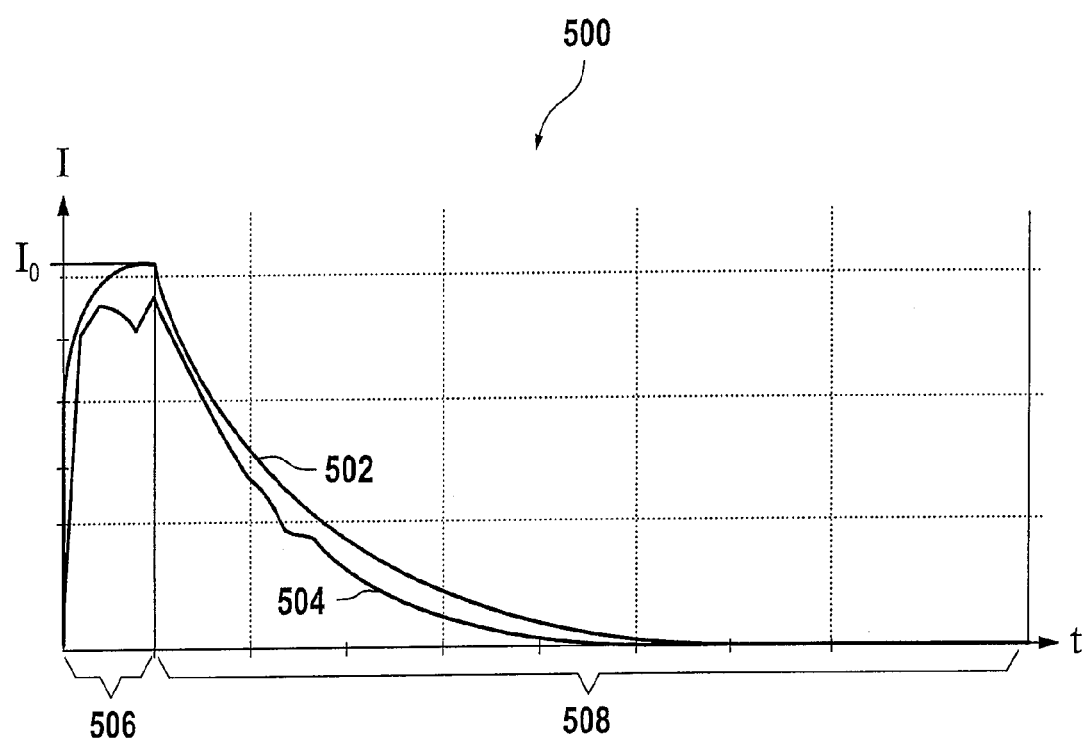
Figure 6:
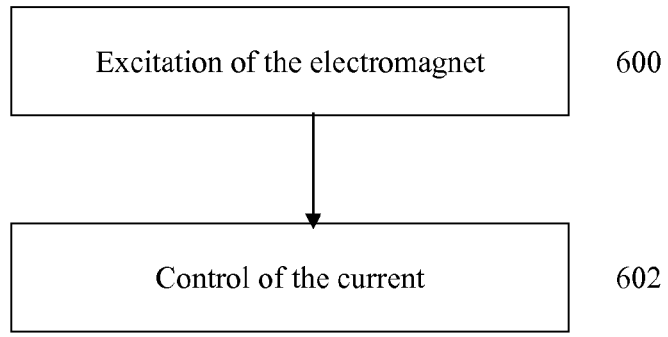
Figure 7:
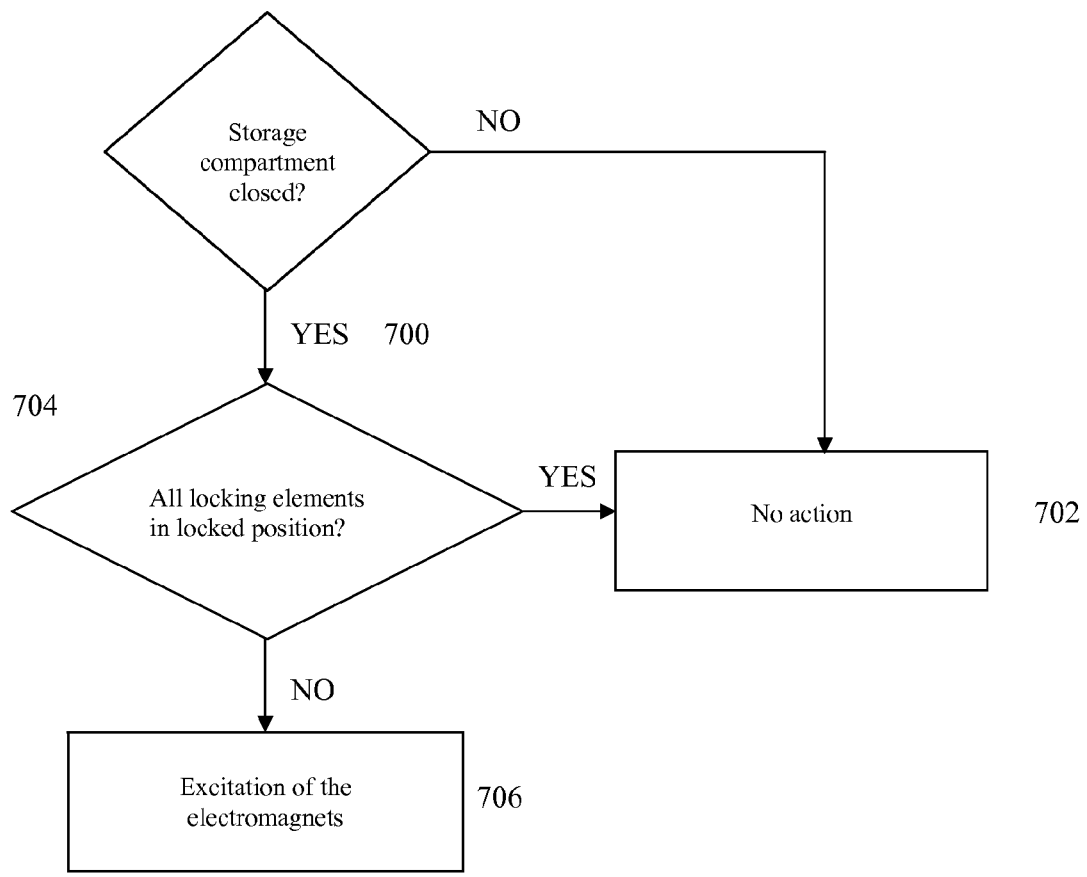

FIG. 4 shows a graph, which illustrates the course of the current flow utilized for the application of the method to unlock a storage compartment according to the method, FIG. 5 shows an additional graph, which illustrates the courses of a calculated and correspondingly measured current drive curve, FIG. 6 shows a flow diagram, which illustrates steps of the method to unlock a storage compartment according to the method, FIG. 7 shows a further flow diagram, which illustrates additional steps of the method according to the invention.

DETAILED DESCRIPTION OF THE INVENTION

Figure 1:
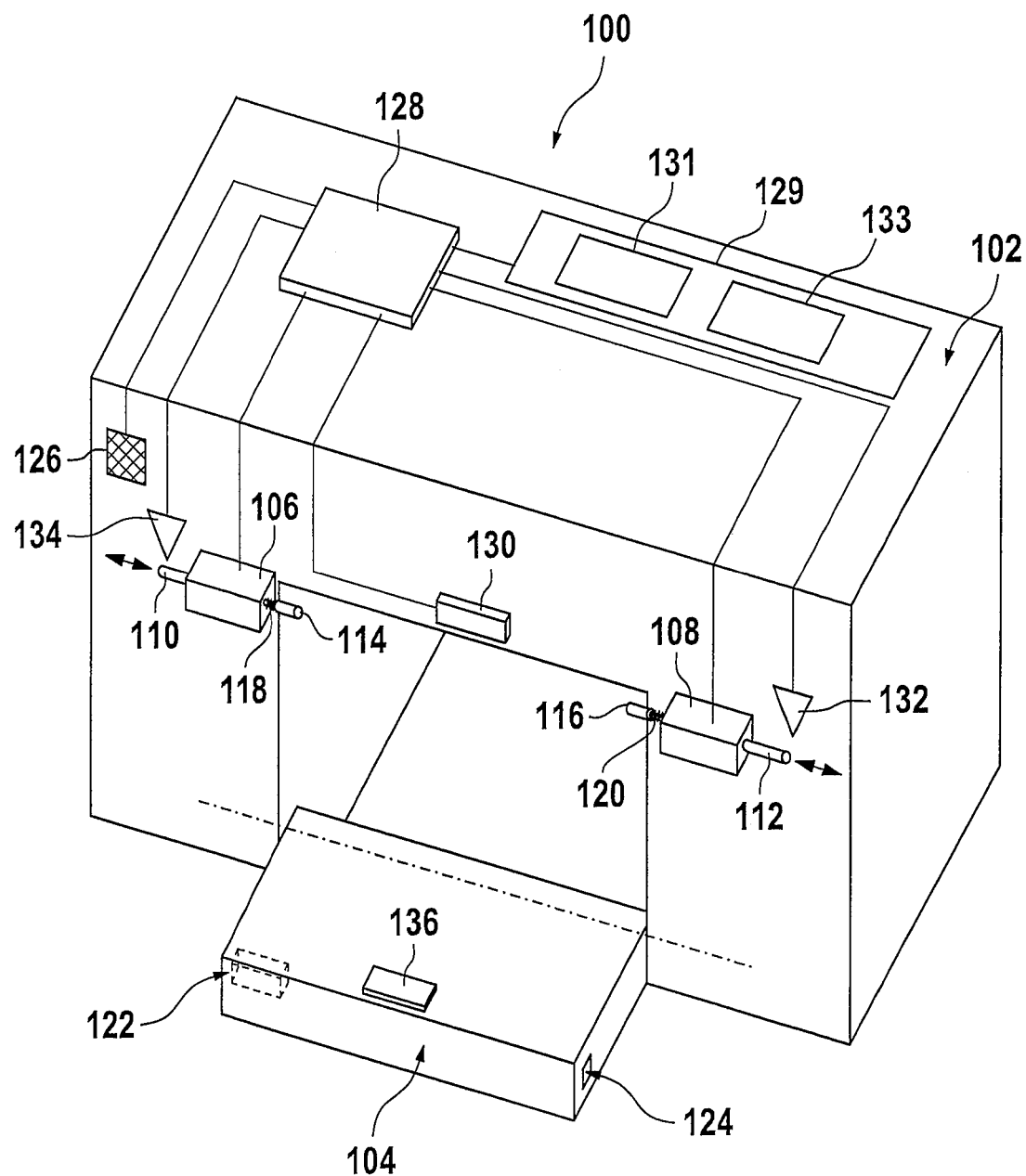
FIG. 1 shows a glove compartment schematically.

FIG. 1 shows a glove compartment 100 schematically. The glove compartment 100 comprises an enclosure 102 and a cover 104. Electromagnets 106 and 108 are arranged inside the enclosure 102. The electromagnets 106 and 108 each comprise an armature 110 or 112, respectively, which, by exciting the magnets alongside a longitudinal bore of the electromagnets, can be moved by the magnetic field generated by the excitement. Hence, the armatures 110 and 112 consist, for example, of soft iron or feature a soft-iron core. Thus, the magnetic field generated by the electromagnets when exciting the electromagnets couples with the magnetic momentum of the armatures generating a force that moves the armatures alongside the longitudinal bore (see arrows).

A locking element 114 or 116, essentially designed in the shape of a pin, is attached to each armature 110 and 112. Each locking element 114 and 116 is supplied with a spring 118 or 120, respectively, which pushes the locking element into a locked position when the electromagnet is not energized, so that the locking elements 114 and 116 engage in recesses 122 and 124 in the cover 104 when the cover 104 is closed, thus locking the glove compartment 100.

If the locking elements 114 and 116 are in locked positions, the armatures 110 or 112 are not in the positions shown here; rather they are embedded as deeply as possible in the corresponding electromagnet, i.e. up to a catch opposing the restoring force inside a longitudinal bore of the magnet.

An operating switch 126 and an electric circuit 128 (for example an integrated circuit) are further mounted inside the glove compartment enclosure 102. An electric current to excite the electromagnets 106 and 108 is generated by means of the electric circuit 128. This may be initiated by a passenger by pushing the operating switch 126.

When the electromagnets 106 and 108 are energized with the electric current, magnetic fields are generated in the electromagnets 106 and 108, which push the armatures 110 and 112 from the longitudinal bores of the corresponding electromagnets against the restoring force of the spring 118 or 120, respectively, until the armatures 110 and 112 take the positions shown in FIG. 1. In this connection, these positions correspond to unlocked positions for the locking elements 118 and 120. In the unlocked positions the locking elements 114 and 116 are pulled from the recesses 122 and 124, thus unlocking the storage compartment.

A measuring unit 129 designed to measure the current, which is used to generate the magnetic fields in the electromagnets 106 and 108, is further arranged at the glove compartment enclosure 102. The means for measuring the current comprise, among other things, a storage 131 and a processor 133. In this process, the storage 131 may, for example, receive instructions that can be executed by a computer, which can be read and utilized by the processor 133, thus carrying out a control of the electric circuit 128. This way the electrical current used to operate the electromagnets 106 and 108 can be regulated.

The electric circuit 128 and the means to measure the electrical current 129 are designed such that an electrical current to excite the electromagnets 106 and 108 is provided for a first time period. In this connection, the provided electrical current is continuously increased over the first time period until the maximum current is reached. The maximum current is reached when the current declines precipitously due to the incipient movement of the armatures 110 or 112 with a given voltage. The result is a current value that corresponds to the maximum current as well as a current value that drops below said maximum current.

It may be noted that, preferably, the electric voltage used to operate the electromagnets 106 and 108 is continuously increased for this purpose. During this increase the flow of current that flows through the electromagnets 106 and 108 is measured. If the voltage reaches this critical point, at which the armatures 110 or 112 begin to move, the electrical current, which had been continuously increasing up to that point, precipitously and independently falls to a value, while it is now possible to relate the maximum current measured up to that point with the now measured value of the current that drops below said maximum current. Thus, by using the processor 133, the minimization of the current in percent is determined based on the maximum and a so-called "minimum value of the current" is determined for said minimization in percent. The determination is carried out on the basis of a table, which is included in the storage 131. In this table corresponding minimum values of the current are assigned to various minimizations of the current in percent based on a maximum.

Such a table can for example be obtained experimentally, in that under different temperature conditions and geometric tolerance influences, the conduct of the armature is determined under different current feeds of the electromagnet, in order to determine therefrom the parameters for the current drop in percent.

The electromagnets 106 and 108 are then supplied with this determined minimal value of the current. The result is that the armatures 110 or 112 are energized with a minimum of electrical current against the restoring force of the springs 118 or 120, so that the anchors 110 or 112 are held in the unlocked position precisely at the point at which they do not move. Such holding takes place over a second time period, wherein the locking element 118 or 120 can be found in the unlocked position over said second time period. In this connection the second time period is chosen precisely such that the cover 104 of the glove compartment 100 is opened from its vertical closed position—not shown here—to the opened position as shown in FIG. 1. This opening may be realized through additional spring elements, pneumatic damping means and gravity.

Strictly speaking, it is sufficient, if the second time period is chosen such that precisely unlocking of the locking elements 114 and 116 takes place from the recesses 122 and 124. As soon as the recesses 122 and 124 are pivoted away from the locking elements 114 and 116, the second time period may be terminated.

After the second time period terminates, the electric current is preferably controlled such that the current is continuously reduced over a third time period. If the current were to be turned off abruptly, the magnetic field generated by the electromagnet 106 or 108 would also be abruptly turned off. Thus, no force would any longer counteract the restoring force of the spring 118, and the restoring force would catapult back the armature 110 and the locking element 118 into the locked position with the maximum possible acceleration. The armature would impact the catch with maximum momentum, which counteracts the restoring force in the locked position. Such impact with maximum momentum would generate a relatively loud noise. By turning off the current over the third time period, the force exerted by the magnetic field on the armature 110 is slowly reduced, since the magnetic field is also not abruptly reduced, but continuously over the third time period. This way, the restoring force of the spring 114 only slowly prevails. Consequently, much lower acceleration forces act on the armature 110 and the locking element 114, or on the armature 112 and the locking element 116, so that they are slowly—and almost without causing any noise—returned to the locked position.

Depending on whether during the unlocking process itself an audible noise is to be generated by the impact of the armature 110 and the locking element when reaching a catch, which determines the unlocked position, the flow of the current can be individually adjusted over the first time period until the measured maximum current is reached. It is for example possible to give the operator of a motor vehicle individually the option of configuring his vehicle in such a way that a corresponding opening noise is generated—or not—when the glove compartment is opened. If no opening noise is to be generated, the electric current is continuously increased over the first time period until the measured maximum current is reached. If, in the process, this current increase curve is not too steep, the armature 110 or 112 will never receive such acceleration due to the additional, timely minimization of the current used to operate the electromagnet to the minimum value, in order to then—when a catch is reached which determines the unlocked position—impact the catch with great momentum to generate a relatively loud noise. In contrast, in case a noise is desired when unlocking the glove compartment, the increase of the electric current over the first time period until the measured maximum current is reached can be regulated such that the armature 110 or 112 experiences such high acceleration that it impacts the catch, which determines the unlocked position, with a predetermined force. However, it must be pointed out that, in this case, the continuous increase of the electric current over the first time period is preferably regulated such that the impact of the armature 110 on the corresponding catch takes place in a controlled manner and only with such maximum force necessary to generate a corresponding noise, whereby the vehicle passenger, who operates the glove compartment, receives an acoustic feedback to the effect that the glove compartment is unlocked.

Furthermore, Hall sensors 130, 132 and 134 can be arranged in the glove compartment enclosure 102, by means of which magnetic fields can be detected. A permanent magnet 136 can for example be mounted to the cover 104. If the cover is closed, the magnetic field generated by the permanent magnet 136 can be detected by the Hall sensor 130. Thus, it is possible to determine whether or not the glove compartment cover 104 is closed or open by means of the Hall sensor 130.

Furthermore, the magnetic field of the armature 112 can be detected with the Hall sensor 132. If the locking element 116 is in the unlocked position, the armature 112 is in a different position relative to the Hall sensor 132, as if the locking element 116 were in the locked position. Thus, the Hall sensor also detects variously strong magnetic fields, depending on whether the locking element 116 is in the locked or unlocked position. Hence, by means of the Hall sensor 132 or with the electric circuit 128, which receives signals measured by the Hall sensor, it is possible to detect whether the armature 112, and thus the locking element 116, is in the unlocked position or in the locked position. Accordingly, by means of the signals received by the Hall sensor 134 the electric circuit 128 can detect, whether the armature 110 or the locking element 114 is in the locked position or in the unlocked position.

It is, however, preferable to do without the use of the Hall sensors 134 and 132. This is possible, since conclusions can be drawn to the current position of the armatures 110 and 112 by precisely measuring the currents used to operate the electromagnets 106 and 108. If, for example, no current feed takes place, it must be assumed—based on the mechanical facts—that the armature 110 or 112 are in the unlocked position. If the electromagnets 106 and 108 are supplied with current, movement of the armature 110 or 112 is detected by detecting the maximum current and subsequent dropping below the maximum current. By analyzing the maximum current and dropping below the maximum current conclusions can then be drawn to the position of the armature 110 or 112. The same applies to the second time period, in which the current is reduced to the predetermined minimum value. This predetermined minimum value of the current can be obtained by setting a certain electric voltage. The objective is, as already indicate above, to hold the armatures 110 or 112 in a predetermined position. If a backward movement of the armatures 110 or 112 into the locked position takes place, such a movement can also be detected by the change in the current flowing through the electromagnets 106 and 108. Preferably, however, the predetermined minimum value is dimensioned precisely such that such a backward movement of the armatures 110 or 112 into the locked position is prevented. Thus, in summary it can be said that safe conclusions can be drawn to the current position of the armatures 110 or 112 by using the means for measuring the current, or the control unit 128, and through precise dimensioning of the used currents and a precise measurement of the used currents, which makes the use of the sensors 132 or 134 redundant. This reduces the system's susceptibility to break down and it is possible to save manufacturing costs.

Figure 2:
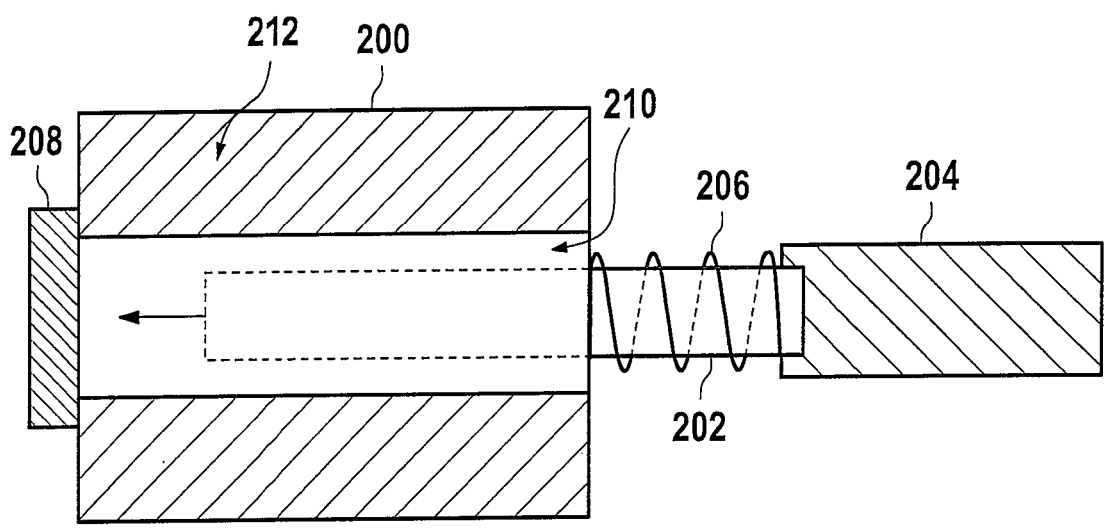
FIG. 2 shows a cross-section of an electromagnet schematically.

FIG. 2 shows a schematic cross-section of an electromagnet 200, to the armature 202 of which a locking element 204 is mounted. The armature 202 is arranged inside a longitudinal bore 210 of the electromagnet, and movable alongside the longitudinal bore 210. The armature 202 or the locking element 204 are further supplied with a spring 206, so that the locking element 204 is at the greatest possible distance from the electromagnet when the magnet 200 is turned off, thus taking a locked position. Coils are arranged inside the enclosure 212 of the electromagnet 200, which generate a magnetic field when energized. Through the magnetic field the armature 202, and thus also the locking element 204, are moved in the direction of the arrow against the restoring force of the spring 206. According to the invention, the current used to energize the magnet is only slowly turned on over the first time period and again slowly turned off over the third time period.

As a result of slowly turning on the current the force exerted by the magnetic field on the armature only slowly prevails over the restoring force of the spring 206, so that the armature 202 or the locking element 204 starts to move at a certain maximum current. At the moment at which the armature 202 or the locking element 204 starts to move, the current needed to drive the electromagnet 200 precipitously falls to a value, which is below the maximum current used up to that point. If such a drop in power is detected, the current used to drive the electromagnet 200 is reduced to a minimum value, so that the armature 202 or the locking element 204 is held in an unlocked position. In this case, the force that acts through the magnet in the direction of the arrow precisely corresponds to the force that acts against the direction of the arrow through the spring 206. This corresponds to a minimum in energy expenditure to hold the armature or the locking element 204.

In order to dampen the jerky start-up of the armature 202 or the locking element 204 when reaching the maximum current and subsequent dropping below said maximum current in such a way that even an impact of the armature 202 on the rear wall of the electromagnet 200 causes no noise, the movement can be further dampened by damping means 208 (PE foam-damping agent), which are mounted at the other end of the longitudinal bore, so that almost no noises are caused by the movement of the armature and the locking element.

In order not to cause any noises by the movement of the armature and the locking element either, the current is turned off slowly and continuously over the third time period. This way, the restoring force of the spring 206 only slowly prevails over the force exerted by the magnetic field on the armature 202, and the armature and the locking element are not abruptly catapulted back into the locked position by the spring force. This prevents a clearly audible noise from being generated for the passenger of the vehicle when the armature impacts a catch of the electromagnet (200) not shown in FIG. 2).

Since this makes it possible to minimize the mechanical stresses on the electromagnet, the armature, the locking element, etc. by the corresponding current feeds according to the invention and the design of the electromagnet, the armature and the locking element according to FIGS. 1 and 2, the mechanical stability of the entire system is thus considerably increased. Thus, overall, noises clearly audible for passengers when locking or unlocking a glove compartment can be nearly completely prevented. If, however, there is still a desire to generate corresponding noises familiar to the passengers of the vehicle when unlocking the glove compartment, the option presents itself to generate these noises, for example, via suitable loudspeakers and sound generators or, alternatively, via a separate relay.

Figure 3:
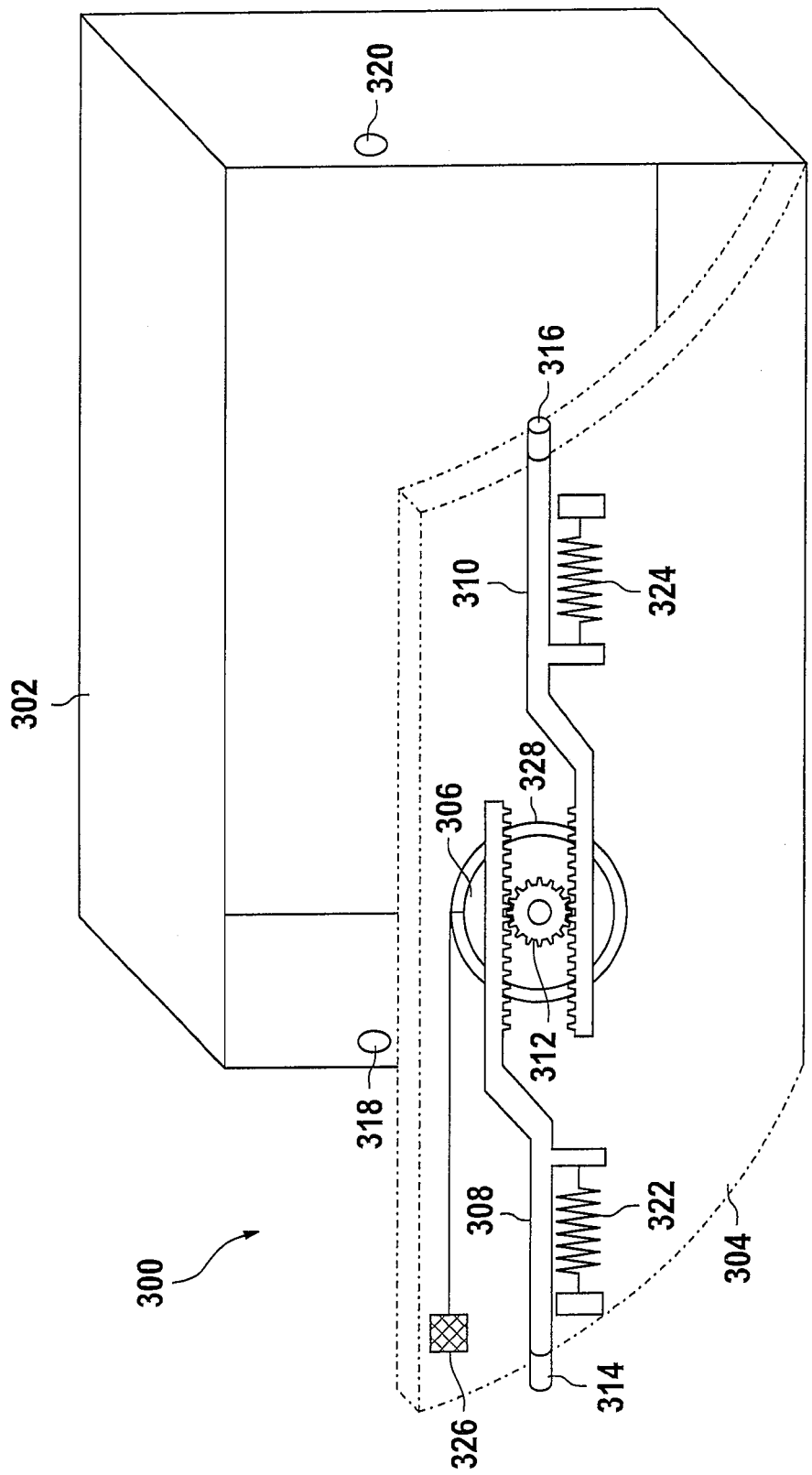
FIG. 3 shows a further glove compartment schematically.

FIG. 3 shows a schematic view of a glove compartment 300 with a glove compartment enclosure 302 and a glove compartment cover 304. One electromagnet 306, two gear rod elements 308 and 310 as well as a gear wheel 312 are arranged in the cover 304. Locking elements 314 and 316 are mounted at one end of the gear rod elements 308 and 310, in each case. Furthermore, each gear rod element 308 or 310 is loaded with a spring 322 or 324, so that the gear rod elements are in a locked position when the electromagnet 306 is not energized. The locking elements 314 and 316 engage in corresponding recesses 318 and 320 in the glove compartment enclosure 302 when the glove compartment cover 304 is closed. The electromagnet can be activated via an operating switch 326, with an electric current to excite the electromagnet being generated via an electric circuit not shown here. As a result of exciting the electromagnet a movement of an armature alongside a longitudinal bore of the electromagnet (stroke magnet) takes place, wherein the gear wheel 312 is moved in such a way that that the gear rod elements are moved against the restoring forces of the springs 322 and 324, wherein the locking elements 314 or 316 can be moved from a locked position to an unlocked position. In this connection, the electromagnet 306 is energized by the electrical current during a first time period. According to the invention the electrical current is not turned off abruptly at the end of the first time period, but continuously reduced during a second time period. The consequence is that the locking elements 314 or 316 or the rod gear elements 308 and 310 are not catapulted back into the locked position. Rather, the gear rod elements and the locking elements will only slowly return to the locked position due to the slow ramp-down of the magnetic field associated with the slow reduction of the current, which also prevents noises generated by the return to, or the reaching of the locked position. Accordingly, the electric current to excite the electromagnet cannot be abruptly turned on, but it is gradually increased over a third time period. The result is that the gear rod and locking elements are not brought from the locked position into the unlocked position abruptly, but gradually. This way, noises generated during the unlocking of the storage compartment are also prevented.

Moreover, according to prior art, electric motors instead of an electromagnet are preferably used to operate the gear rod elements. Electric motors, however, have the unpleasant characteristic that they cause noises in a frequency range between 1 and 3 kHz when in operation. This frequency range is relatively unpleasant for the human ear. In contrast, electromagnets generate noises in a range of around 500 Hz. These noises are clearly more pleasant to hear than noises in the range between 1 and 3 kHz. Thus, by using electromagnets instead of electric motors a glove compartment is realized that makes noises that occur during opening and closing significantly more pleasant to hear for a vehicle passenger.

In addition, the electromagnet 306 may be enclosed by sound damping means 328, such as for example foam made of PE or other sound-absorbing material, so that noises caused by the operation of the electromagnet 306 cannot get out, or only to a limited degree.

FIG. 4 shows a graph 400, which depicts a course of a calculated current drive curve 402. The x-coordinate refers to the time t, while the y-coordinate refers to the current I. Thus, the current drive curve reflects the chronological flow of the current I(t) of the current used to energize the electromagnets. According to the invention, the current I(t) of the current drive curve 402 is linearly increased from zero to a current Imax during the first time period 406. In doing so, the current is increased precisely over such a length of time until a spontaneous drop 404 of the current to the current IU is detected. Such a spontaneous drop of the current is caused by the spontaneous beginning of the movement of the armature in the electromagnet, which is energized by the current drive curve 402. As soon as this power drop 404 is detected, the current used to energize the electromagnet is reduced to the value Imin. Said value Imin is determined by the ratio between Imax and IU. Imin is entered in a table allocated to this ratio between Imax and IU and optimized precisely such that the armature of an electromagnet is precisely identical with the opposing restoring force of the spring that pushes the armature from the electromagnet. Thus, the armature remains in a position over the second time period 408, during which the glove compartment is unlocked. Following the second time period 408 the flow of the current is linearly reduced from the value Imin to zero during the third time period 410. This reduction in turn leads to a return of the armature to the locked position.

In the present case of FIG. 4 it is assumed that the time period between the drop of the current from Imax to IU and the subsequent beginning reduction of the current to Imin is sufficient to move the armature far enough into the electromagnet that an unlocked position for the glove compartment is reached. If, however, the mechanical reaction of the armature inside the electromagnet is too slow, a continuous or exponentially falling reduction of the current from IU to Imin may be used over a time period 409, which lies within the time period 408 and directly follows the time period 406. This is illustrated in FIG. 4 by the dashed curve 405. The dashed current curve 405 in FIG. 4 shows that the armature continues to be pulled into the electromagnet in a controlled manner over a time period 409 following the spontaneous jerky start-up of the armature after dropping below the maximum voltage Imax to the voltage IU. Thus, by specifically setting the time period 409, any position of the armature relative to the electromagnet can be achieved. Thus, it is possible to pull the armature out from the catch, which determines the unlocked position of the glove compartment cover, far enough to subsequently hold the armature in this unlocked position during the time period 408'. Thus, in FIG. 4 the second time period 408 is composed of the damping time 409 and the time period 408'.

FIG. 5 shows a further graph 500, which illustrates the courses of a calculated current drive curve 502 and a correspondingly measured current drive curve 504. As in FIG. 4, the x-coordinate also refers to the time t, while the y-coordinate refers to the current I. Thus, the current drive curve reflects the temporal flow of the current I(t) of the current used to energize the electromagnet. In contrast to FIG. 4, the current is not measured in FIG. 5, although it is still possible to move the armature and the locking element without noise through the electromagnet from the locked position to the unlocked position and back. However, the disadvantage here is that the mechanical stresses on the mechanical components like the electromagnet, the spring, the armature and the locking element are significantly higher. Moreover, it is not possible to check the current position of the armature relative to the electromagnet, so that Hall sensors, for example, must be utilized here to detect its position.

In the case of FIG. 5 a current drive curve 502 is exponentially increased from 0 to a current I0 during a first time period 506, and then exponentially lowered to 0 during the third time period 508. In this connection it is assumed that an unlocking time of the glove compartment cover is sufficiently ensured. This may for example be the case, if unlocking the glove compartment cover can be accomplished with already two thirds of I0, whereby the additional one third of I0, with which the electromagnet is excited, merely serves to hold the armature in the unlocked position.

FIG. 5 also shows a measured current drive curve 504, which was measured with external measuring devices, and which essentially reflects the course of the calculated current drive curve 502. However, the measured curve also includes the current induced by the armature in the coils of the electromagnet, which, in FIG. 4, is used to detect the armature that is beginning to move. This ultimately explains the fluctuations of the measured current drive curve 504 in the time segment 506.

In this process the current I0 as well as the optimal values for the first and the third time period 506 and 508 depend on the used electromagnets.

FIG. 6 shows a flow diagram, which indicates steps of the method to unlock a storage compartment according to the method of the invention. In step 600 an electromagnet is excited with an electric current, wherein the electromagnet comprises an armature, wherein the armature of the electromagnet is coupled to one or several locking elements, wherein each locking element, due to a restoring force of a spring, is in a locked position through engagement in recesses of the storage compartment when the electromagnet is not energized, wherein the locking elements are moved into an unlocked position as a result of exciting the electromagnet with the electric current. The electrical current is further controlled in step 602 such that, after turning on the current after measuring when the maximum current is reached and subsequent dropping below said maximum current, the current is reduced to a predetermined minimum value of the current.

Practically, this can for example be accomplished by continuously and steadily increasing an electric voltage applied to the electromagnet over a first time period. This way, the electric current flow through the electromagnet is measured at the same time the voltage is increased. At the moment when the electric current flow reaches a maximum and subsequently drops again, the electric voltage is then reduced such that the predetermined minimal value of the current flow is reached.

FIG. 7 shows a flow diagram, which illustrates steps of the method according to the invention. In step 700 it is detected whether the storage compartment is closed. If this is not the case, the method is continued with step 702, while no further action follows. If it is detected in step 700 that the storage compartment is closed, the method is continued with step 704. Whether each locking element has taken its locked position when the storage compartment is locked is detected in step 704. If this is not the case, the method is continued with step 706. In step 706 the electromagnets are excited, wherein, as described hereinabove, the storage compartment is unlocked and thus opened. This may be understood by a vehicle passenger as a request to properly lock the storage compartment. If it is detected in step 704 that all locking elements are in the locked position, the method is continued with step 702, while no further action follows.

LIST OF REFERENCES

100 Glove compartment
102 Enclosure
104 Cover
106 Electromagnet
108 Electromagnet
110 Armature
112 Armature
114 Locking element
116 Locking element
118 Spring
120 Spring
122 Recesses
124 Recesses
126 Operating switch
128 Electric circuit
129 Means for measuring current
130 Hall sensor
131 Storage
132 Hall sensor
133 Processor
134 Hall sensor
136 Magnet
200 Electromagnet
202 Armature
204 Locking element
206 Spring
208 Damping means
210 Longitudinal bore
212 Magnet enclosure
300 Glove compartment
302 Enclosure
304 Cover
306 Electromagnet
308 Gear rod element
310 Gear rod element
312 Gear wheel
314 Locking element
316 Locking element
318 Recess
320 Recess
322 Spring
324 Spring
326 Operating switch
328 Sound damping means
400 Graph
402 Current drive curve
404 Drop
405 Current drive curve
406 First time period
408 Second time period
409 Time period
410 Third time period
500 Graph 502 Calculated current drive curve
504 Measured current drive curve
506 First time period
508 Third time period

What is claimed is:

1. A closure for a storage compartment of a motor vehicle, comprising:
   at least one electromagnet, wherein the at least one electromagnet comprises an armature, wherein the armature can by moved by excitation of the electromagnet, wherein a movement of the armature can be transmitted to at least one locking element, wherein the at least one locking element, due to a restoring force of a spring, is in a locked position for the storage compartment when the electromagnet is not energized,
   means for generating an electric current for exciting the electromagnet,
   means for measuring the electric current flow used for exciting the electromagnet, wherein the means for generating the current are designed to control the electric current such that, after turning on the current after measuring when a maximum current is reached and subsequent dropping below said maximum current, the current is reduced to a predetermined minimum value, wherein the minimum value is dimensioned such that the armature is held in its position against the spring force acting on the armature.

2. A closure in accordance with claim 1, wherein the electrical current for exciting the electromagnet is controllable such that the electric current can be continuously increased over a first time period until the measured maximum current is reached.

3. A closure in accordance with claim 2, wherein the electrical current can be reduced to the predetermined value for a second time period, wherein the locking element is in an unlocked position for the storage compartment over the second time period.

4. A closure in accordance with claim 3, wherein the electrical current, after the end of the second time period, can be controlled such that it is continuously reduced over a third time period.

5. A closure in accordance with claim 4, wherein the electric current can be increased exponentially or linearly during the first time period and/or decreased during the third time period.

6. A closure in accordance with claim 1, further comprising means to determine the predetermined minimal value of the current, wherein the minimal value of the current depends on the ratio between the measured maximum current and the measured value at which the maximum current is not reached.

7. A closure in accordance with claim 1, wherein the predetermined minimal value can be determined via a table, wherein in the table the minimum value of the current is assigned to the ratio between the measured maximum current and the measured value at which the maximum current is not reached.

8. A closure in accordance with claim 4, wherein the first time period lies between 5 and 100 milliseconds and/or wherein the second time period lies between zero and 300 milliseconds and/or wherein the third time period lies between 50 and 500 milliseconds.

9. A closure in accordance with claim 1, wherein the closure comprises a sensor for each of the at least one electromagnets, wherein the sensor makes it possible to detect if the armature of the electromagnet is in a position that corresponds to the locked position of the corresponding locking element.

10. A closure in accordance with claim 1, wherein the closure comprises a sensor for each locking element, wherein the sensors make it possible to detect if the locking elements are in the locked position when the storage compartment is closed.

11. A closure in accordance with claim 1, wherein one locking element is mounted to the armature of each of the at least one electromagnet.

12. A closure in accordance with claim 1, wherein the closure comprises one electromagnet, two gear rod elements and one gear wheel, wherein one locking element each is movable at one end of each gear rod element, wherein the gear wheel can be moved by the armature of the electromagnet, wherein one movement of the gear wheel can be transmitted to the gear rod elements, wherein the locking elements can be moved from the locked position to the unlocked position by the movement.

13. A closure in accordance with claim 1, wherein the closure comprises one electromagnet, two gear rod elements and one gear wheel, wherein one locking element each is movable at one end of each gear rod element, wherein one of the gear rod elements can be moved by the armature of the electromagnet, wherein one movement of said gear rod element can be transmitted to the other gear rod element by the gear wheel, wherein the locking elements can be moved from the locked position to the unlocked position by the movement.

14. A closure in accordance with claim 1, wherein the closure comprises damping means, wherein the damping means are provided to dampen one movement of the armature and the locking elements.

15. A closure in accordance with claim 1, wherein the electromagnet is enclosed by sound damping means.

16. A closure in accordance with claim 1, wherein the electromagnet is a double stroke actuator.

17. A storage compartment for a motor vehicle comprising a closure in accordance with claim 1.

18. A storage compartment in accordance with claim 17, wherein the storage compartment comprises a storage compartment enclosure and a cover, with either the storage compartment enclosure or the cover comprising the closure.

19. A storage compartment in accordance with claim 18, wherein the storage compartment enclosure or the cover comprises at least one recess, wherein one recess each is arranged in a complementary way to one locking element, wherein the storage compartment cover may be locked in that the locking element engages in the recess.

20. A storage compartment in accordance with claim 17, wherein the storage compartment comprises a glove compartment.

* * * * *